United States Patent [19]

Schubach

[11] 4,021,105
[45] May 3, 1977

[54] APPARATUS FOR PROJECTING ENLARGED VIDEO IMAGES

[75] Inventor: Stanley D. Schubach, Salt Lake City, Utah

[73] Assignee: Tapehead Company, Inc., Salt Lake City, Utah

[22] Filed: Nov. 5, 1975

[21] Appl. No.: 629,035

[52] U.S. Cl. .................. 353/119; 312/7 TV; 353/122

[51] Int. Cl.$^2$ ............... G03B 21/14; A47H 81/06

[58] Field of Search ............ 353/119, 121, 122; 312/7 TV

[56] References Cited

UNITED STATES PATENTS

| 2,604,536 | 7/1952 | Rose | 312/7 TV |
| 3,820,885 | 6/1974 | Miller | 353/122 |

FOREIGN PATENTS OR APPLICATIONS

| 581,916 | 9/1958 | Italy | 312/7 TV |

Primary Examiner—Steven L. Stephan
Attorney, Agent, or Firm—K. S. Cornaby

[57] ABSTRACT

An apparatus is provided for receiving a video image from a television receiver and projecting an enlargement of the image onto a suitable reflecting means, and alternatively for providing direct viewing of the television receiver video screen. The apparatus has a housing, preferably rectangular, with a pair of cylindrical support means extending outwardly respectively from mutually opposing vertical sides of the housing. The cylindrical support means are adapted to be rotatably held by a support frame which permits the housing to be rotated about an axis concentric with the cylindrical support means. The housing is adapted to hold a television receiver and a removeable enlarging lens means, so that when the housing is in one predetermined position on the support frame, the video image from the receiver is enlarged and projected from the enlarging lens means. When the housing is rotated about the support frame to another predetermined position and the enlarging lens means removed, the television receiver can be viewed directly.

6 Claims, 4 Drawing Figures

APPARATUS FOR PROJECTING ENLARGED VIDEO IMAGES

BACKGROUND OF THE INVENTION

In recent years several proposals have been made for enlarging the video image viewed on a television receiver video screen and for projecting the enlarged image upon a reflecting screen or other reflecting surface. One such apparatus in present commercial production provides for the television receiver, enlarging lens and reflecting screen to be housed in a single large box. The transparent protecting screen is removed from the television receiver video tube, the internal components of the receiver are modified to project the video image upside-down on the video tube, and the enlarging lens is fixedly mounted in front of the receiver's video tube. It is impossible to view the video screen or tube directly, as in normal television viewing, and the projected enlarged video image can only be viewed upon the built-in reflecting screen in the large box housing.

Similarly, other proposed apparatuses for projecting enlarged video images have no provision for direct viewing of the television receiver's video screen as an alternative to viewing the projected enlarged image; and many have built-in reflecting screens limiting the placement and selection of types of reflecting means.

It is an objective of this invention to provide an apparatus for projecting enlarged video images which is adapted for alternative direct viewing of the television receiver's video screen.

It is a further objective of this invention to provide an apparatus for projecting enlarged video images which does not require a built-in reflecting screen disposed a definite, unchageable distance from the image-enlarging means.

It is also an objective of this invention to provide an apparatus for projecting enlarged video images which can permit direct viewing of a television receiver's video screen by a simple rotational movement of the apparatus housing on a support frame and removal of the image-enlarging lens means from the apparatus.

These and other objectives will become apparent from the description of the invention which follows:

SUMMARY OF THE INVENTION

The invention provides an improvement for an apparatus for projecting enlarged video images from a television receiver. The apparatus has a housing adapted to hold a television receiver and removeable, adjacently-disposed video image enlarging lens means. The housing has a pair of cylindrically-shaped support means extending laterally outwardly respectively from mutually opposing vertical side walls of the housing. The housing is rotatably supported by a support frame having a pair of mutually-opposing vertical side wall means in register with the vertical side walls of the housing and having means for rotatably mounting respectively the pair of cylindrical support means attached to the housing, such that the housing can be rotated on the frame about a horizontal axis concentric with the pair of cylindrical support means. Reflecting means, such as a reflecting screen, can be provided if desired to reflect the projected enlarged image from the enlarging lens means. The reflecting means can be disposed on its own mounting means, on a wall or elsewhere as desired.

THE DRAWINGS

The best mode presently contemplated for practising the invention is set forth in the attached drawings, in which:

FIG. 1 is a top plan sectional view showing the apparatus housing interior with the television receiver and enlarging lens means; and also showing a reflecting screen;

FIG. 2, a perspective view of the apparatus shown in position for projecting enlarged video images;

FIG. 3, another perspective view of the apparatus shown in position with the housing rotated about the support frame for direct viewing of the receiver, and FIG. 4, a perspective view of a preferred embodiment of a reflecting screen adapted to be mounted on a wall with doors which can be closed to cover the screen when not in use.

DETAILED DESCRIPTION OF A PREFERRED EMBODIMENT SHOWN IN THE DRAWINGS

Figure 1:
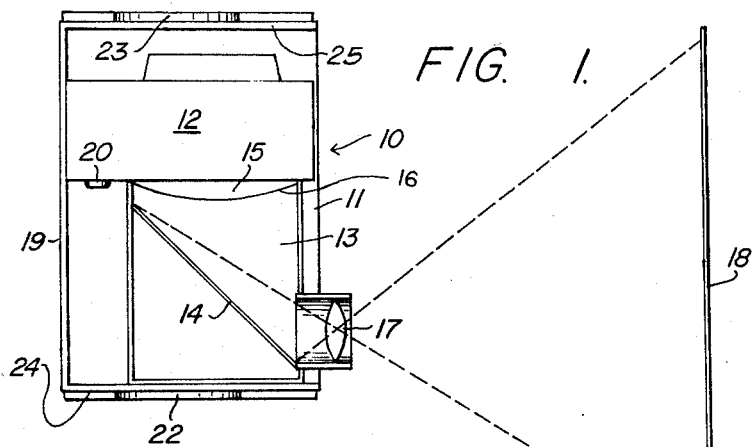
Figures 2, 3:
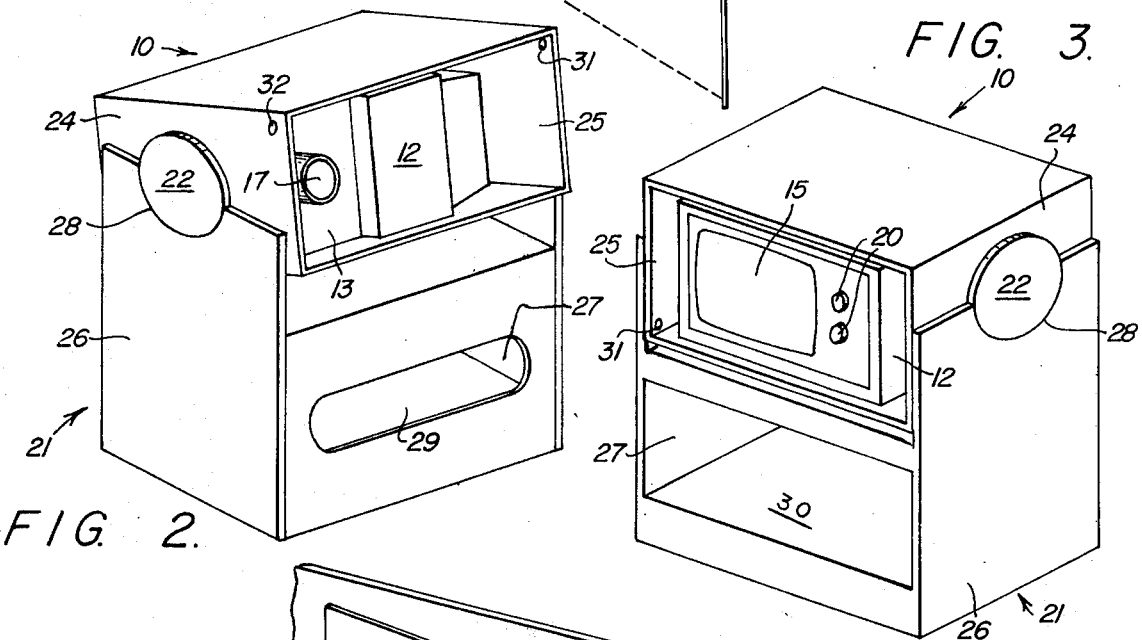

As shown in FIGS. 1, 2 and 3, the apparatus has a housing 10 which is preferably rectangular in shape having one longitudinal side 11 open. Housing 10 is adapted to hold a television receiver 12 and a video image enlarging lens means which in this embodiment is a rectangular box 13 containing a mirror 14 angled to reflect the video image projected from the receiver's video screen 15 through an aperture 16 in box 13 to mirror 14 and hence into and through an enlarging lens 17 mounted in an adjacent side wall of box 13.

As shown in FIGS. 1 and 2, receiver 12 is disposed within housing 10 upside-down when in position for the projection of enlarged video images. The purpose of this positioning is to provide a video image which when passed through mirror 14 and lens 17 will project right-side up on a reflecting surface, shown here as a reflecting screen 18. The dotted line in FIG. 1 traces the path of the video image from the receiver screen 15 to reflecting screen 18. Housing 10 is preferably constructed so as to snugly receive receiver 12 with minimal clearance top and bottom. An aperture in housing rear wall 19 (not shown) provides access to the receiver controls 20 when the receiver is in the enlarged projection mode shown in FIGS. 1 and 2.

Enlarging lens box 13 is disposed within housing 10 such that the aperture 16 in the side wall of box 13 fits snugly around receiver screen 15 to prevent stray light from entering box 13. Lens 17 is preferably of the barrel rotating type that provides for manual focusing of the projected image depending upon the distance reflecting screen 18 is from the lens 17.

A support frame 21, as shown in FIGS. 2 and 3, supports housing 10 and permits rotational movement of the housing. Housing 10 is provided with a pair of cylindrical support members 22, 23 which are fixably attached to, and extend respectively laterally outwardly from, mutually opposing vertical end walls 24, 25 of housing 10. Support frame 21 has corresponding vertical end walls 26, 27 which have means for receiving and rotationally holding cylindrical members 22, 23. The means for holding cylindrical member 22, 23 in this embodiment comprise a half-circle aperture 28 cut into each of the upper ends of frame sides 26, 27. Apertures 28 correspond to members 22, 23, and are of the necessary size and shape to permit rotation of the cylindrical members and the housing 10 within aperture 28 about a horizontal axis which is concentric with cylindrical members 22, 23.

Accordingly, housing 10 can be rotated about frame 21 to dispose receiver 12 upside-down for enlarged projection, as shown in FIGS. 1 and 2; or to dispose receiver 12 right-side up facing the opposite side of frame 21 as shown in FIG. 3. FIG. 3 depicts receiver 12 in position for direct viewing with enlarging lens box 13 removed and receiver 12 turned 90° around in housing 10 to expose video screen 15 and controls 20 directly to a viewer (not shown). In this manner, the apparatus of the invention can be adapted to provide a projected enlarged video image upon a reflecting surface, or provide for direct viewing of the television receiver's video screen. During rotation of housing 10, receiver 12 rests snugly within housing 10 and cannot fall out, since rotation and balance of housing 10 on frame 21 preferably provides that open end 11 is never below the horizontal.

Support frame optionally has a cloth-covered aperture 29 at one side to enhance the appearance of the frame, and can have an internal shelf 30 accessible from the opposite side to receive and hold enlargement lens box 13 when not in use.

In a preferred embodiment shown in FIG. 3, housing 10 has a pair of lock knobs 31, 32 attached respectively to housing end walls 24, 25 for the purpose of securing housing 10 to apertures in frame 21 in the horizontal position for direct viewing as a security precaution. When housing 10 is in the projected image mode (FIG. 2), the housing may be slightly inclined to project the enlarged image upon a reflecting surface higher than the horizontal for better viewing. The weight of the receiver and lens box in housing 10 serve to hold the housing in a fixed position due to friction between the surfaces of cylindrical members 22, 23 and aperture 28.

Figure 4:
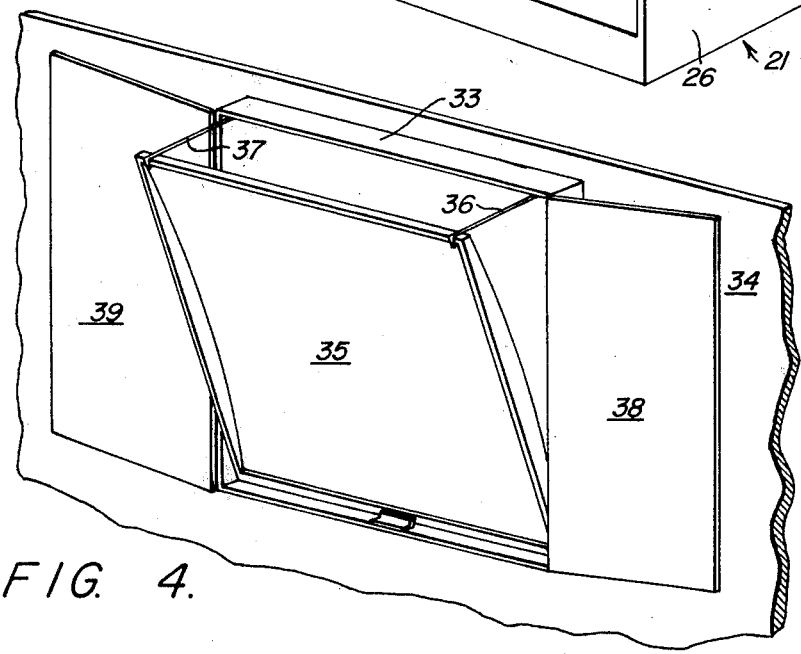

FIG. 4 shows an embodiment of a reflecting screen combination 33 mounted on a vertical wall 34. Screen combination 33 has a reflecting screen 35 which can be tilted downwardly and held by means of wires 36, 37. Combination 33 has a pair of doors 38, 39 which can be closed when screen 35 is not in use to provide a finished appearance.

Although this invention has been described herein in detail with respect to certain preferred embodiments thereof, it will be understood that the scope of the invention is limited only by the claims appended hereto.

I claim:

1. Apparatus for projecting enlarged video images, comprising in combination:

a housing having vertical sides, said housing having a pair of cylindrical support means extending outwardly respectively from mutually opposed vertical sides of the housing;

a frame for supporting said housing having a pair of mutually opposed vertical sides in register with said vertical sides of said housing, said frame sides each having notches adapted to pivotally hold said cylindrical support means so as to permit rotational movement of said housing about a first horizontal axis concentric with said cylindrical support means;

a television receiver moveably mounted in said housing for rotation about a second axis perpendicular to said first axis; and enlarging lens means movably mounted in said housing so as to be positionable adjacent said television receiver in said housing, for receiving video images said television receiver being normally positioned in said housing for normal viewing, and wherein when enlarged images of the television receiver are to be projected, the television receiver is rotated about said second axis, the enlarging lens means is positioned adjacent the television receiver to receive images therefrom, and the housing is rotated one hundred eighty degrees about said first axis to dispose said television receiver upside down so that the projected images will be disposed right side up from said television receiver and projecting enlarged video images.

2. Apparatus as set forth in claim 1, having means for locking said housing in a predetermined position with respect to said frame.

3. Apparatus as set forth in claim 1, wherein said notches of said support frame are half-circular notches and are disposed along the upper edges of said side to receive and pivotally hold said cylindrical support means on said housing.

4. Apparatus as set forth in claim 1, wherein said frame has storage space for holding said enlarging lens means when said lens means is not in use.

5. Apparatus as set forth in claim 1, wherein said enlarging lens means comprises a housing containing a mirror mounted therein and an enlarging lens mounted in a side thereof, said mirror being so positioned as to reflect a video image from said television receiver through said enlarging lens for projection of an enlarged image onto said reflecting means.

6. Apparatus as set forth in claim 1, including a reflecting screen for disposition a predetermined distance from said enlarging lens means for the purpose of reflecting enlarged video images projected from the enlarging lens means.

* * * * *